US008595385B1

(12) United States Patent
Shapiro et al.

(10) Patent No.: US 8,595,385 B1
(45) Date of Patent: Nov. 26, 2013

(54) METHOD AND SYSTEM FOR SUBMISSION QUEUE ACCELERATION

(71) Applicants: Michael W. Shapiro, San Francisco, CA (US); Todor Mollov, Menlo Park, CA (US)

(72) Inventors: Michael W. Shapiro, San Francisco, CA (US); Todor Mollov, Menlo Park, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/903,125

(22) Filed: May 28, 2013

(51) Int. Cl.
*G06F 15/16* (2006.01)

(52) U.S. Cl.
USPC ............................................. 709/253; 710/52

(58) Field of Classification Search
USPC .............................................. 709/253; 710/52
See application file for complete search history.

(56) References Cited

U.S. PATENT DOCUMENTS

| | | | |
|---|---|---|---|
| 7,260,703 B1* | 8/2007 | Moore et al. ................ 711/203 |
| 8,244,935 B2* | 8/2012 | Leventhal et al. ............. 710/39 |
| 8,364,869 B2 | 1/2013 | Arakawa et al. | |
| 8,418,166 B2* | 4/2013 | Armstrong et al. .......... 717/168 |
| 2005/0220128 A1* | 10/2005 | Tucker et al. ................. 370/412 |
| 2005/0251547 A1* | 11/2005 | Bello et al. .................... 709/200 |
| 2009/0097495 A1* | 4/2009 | Palacharla et al. ........... 370/413 |
| 2010/0131734 A1 | 5/2010 | Clegg et al. | |
| 2011/0320649 A1* | 12/2011 | Leventhal et al. .............. 710/39 |
| 2012/0060010 A1 | 3/2012 | Shimozono et al. | |
| 2012/0151472 A1* | 6/2012 | Koch et al. ........................ 718/1 |
| 2012/0179932 A1* | 7/2012 | Armstrong et al. .......... 714/4.11 |
| 2013/0191821 A1* | 7/2013 | Armstrong et al. .......... 717/171 |

OTHER PUBLICATIONS

Notice of Allowance issued in U.S. Appl. No. 13/673,348 dated Aug. 20, 2013 (13 pages).
Supplemental Notice of Allowability issued in U.S. Appl. No. 13/673,348 dated Sep. 13, 2013 (6 pages).

\* cited by examiner

*Primary Examiner* — Douglas Blair
(74) *Attorney, Agent, or Firm* — Osha Liang LLP

(57) ABSTRACT

In general, the invention relates to a method for writing data to server submission queues in a storage controller. The method includes receiving an I/O request, where the I/O request includes a command, where the I/O request is associated with a vSQ, and where the vSQ appears to the client as a set of memory locations in memory operatively connected to a storage controller. The method further includes obtaining a vSQ ID associated with the vSQ, identifying a sSQ based on the vSQ and a vSQ-to-sSQ mapping, generating a submission queue entry comprising the command and the vSQ ID, and sending the submission queue entry to the storage controller, where the sSQ is located in the memory and where the storage controller is configured to place the submission queue entry in the sSQ.

20 Claims, 10 Drawing Sheets

METHOD AND SYSTEM FOR SUBMISSION QUEUE ACCELERATION

BACKGROUND

Storage controllers typically include one submission queue per physical port that connects a client to the storage controller. In order to process I/O requests, the storage controller includes logic to schedule and execute the I/O requests received through the submission queues. Since all requests from a particular client are received through the submission queue for that client's physical port, the re-ordering and scheduling of I/O requests is solely handled by the storage controller after the I/O requests are submitted.

SUMMARY

In general, in one aspect, the invention relates to a method for writing data to server submission queues in a storage controller. The method includes receiving an input/output (I/O) request, wherein the I/O request comprises a command, wherein the I/O request is associated with a virtual submission queue (vSQ), wherein the vSQ appears to the client as a set of memory locations in memory operatively connected to a storage controller, obtaining a virtual server queue identifier (vSQ ID) associated with the vSQ, identifying a server submission queue (sSQ) based on the vSQ and a vSQ-to-sSQ mapping, generating a submission queue entry comprising the command and the vSQ ID, and sending the submission queue entry to the storage controller, wherein the sSQ is located in the memory, wherein the storage controller is configured to place the submission queue entry in the sSQ.

In general, in one aspect, the invention relates to a system comprising a submission queue accelerator interposed between a client and a storage controller, wherein the submission queue accelerator is configured to: receive an input/output (I/O) request, wherein the I/O request comprises a command, wherein the I/O request is associated with a virtual submission queue (vSQ), wherein the vSQ appears to the client as a set of memory locations in memory operatively connected to a storage controller, obtain a virtual server queue identifier (vSQ ID) associated with vSQ, identify a server submission queue (sSQ) based on the vSQ and a vSQ-to-sSQ mapping, generate a submission queue entry comprising the command and the vSQ ID, and send the submission queue entry in a sSQ store command to the storage controller; and the storage controller configured to: receive the sSQ store command, and store the submission queue entry in the sSQ, wherein the sSQ is one a plurality of sSQs located in the memory.

In general, in one aspect, the invention relates to a method for writing data to server submission queues in a storage controller, comprising receiving an input/output (I/O) request, wherein the I/O request comprises a command and a priority class, wherein the I/O request is associated with a virtual submission queue (vSQ), wherein the vSQ appears to the client as a set of memory locations in memory operatively connected to a storage controller, obtaining a virtual server queue identifier (vSQ ID) associated with vSQ, obtaining the priority class from the I/O request, identifying a server submission queue (sSQ) based on the priority class and a priority class-to-sSQ mapping, generating a submission queue entry comprising the command, the priority class, and the vSQ ID, and sending the submission queue entry to the storage controller, wherein the sSQ is located in the memory, wherein the storage controller is configured to place the submission queue entry in the sSQ.

Other aspects of the invention will be apparent from the following description and the appended claims.

DETAILED DESCRIPTION

Figure 1A:
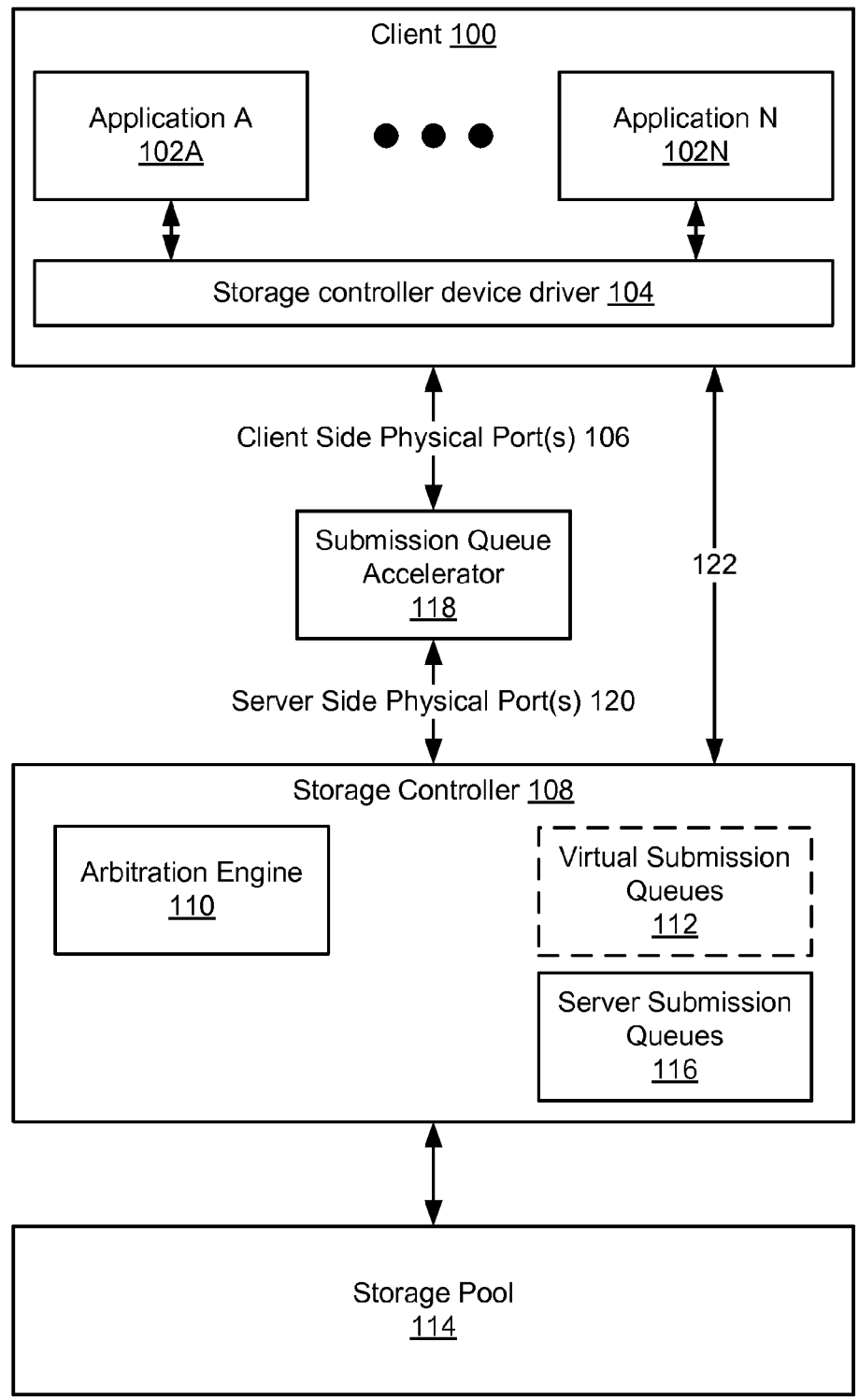
FIG. 1A shows a system in accordance with one or more embodiments of the invention.
Figure 1B:
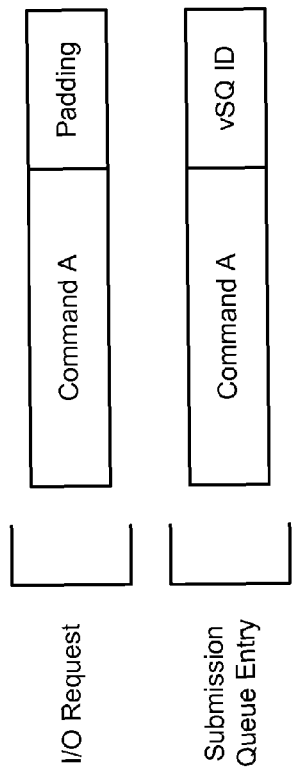
FIGS. 1B-1C show I/O requests and submission queue entries in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to creating and using multiple virtual and server submission queues to process I/O requests. More specifically, embodiments of the invention relate to (i) allowing clients to create and use large numbers of virtual submission queues, (ii) allowing a storage controller to implement a smaller number (relative to the number of virtual submission queues) of server submission queues, and (iii) providing a submission queue accelerator to translate I/O requests to a particular virtual submission queue to corresponding submission queue entries.

In one or more embodiments of the invention, by providing multiple virtual submission queues (vSQs) and allowing the client to select the vSQ in which to place the I/O request at the time the I/O request is submitted to the storage controller, (i) the storage controller does not need to implement arbitration logic to prevent small I/O requests from unnecessarily blocking larger I/O requests and/or (ii) the storage controller does not need to implement logic to analyze logical objects and their I/O dependency requirements.

If the vSQs are implemented by the storage controller, then as the number of vSQs increases, the resources required to manage and poll the status of each of the vSQs in order to determine whether there are new I/O requests to process also increase. As a result, there may be a significant decrease in performance related to the processing of I/O requests.

In order to address this potential performance issue, embodiments of the invention use vSQs (which are not managed by the server), server submission queue (sSQ) (which are managed by the storage controller), and a submission queue accelerator(s) to translate I/O requests that were originally intended for a particular vSQ to a sSQ, where the number of sSQs is less than the number of vSQs. In this manner, the client still retains the benefit of using vSQs while at the same time storage controller is able to continue to operate without any performance penalty (or a limited performance penalty) associated with managing a large number of vSQs; rather, the storage controller managers a smaller number of sSQs. In this manner, embodiments of the invention enable the storage controller to significantly scale up the number of vSQs that may be used by clients without incurring (or at least mitigating) the negative performance impacts described above.

For purposes of this invention, an I/O request (see FIGS. 1B-1C) includes a command and padding, where the command specifies a logical address of an object (i.e., data) stored on the server or the logical address of an object stored in memory or persistent storage that is operatively connected to the client. The command may also include other information such as the size of the object. In one embodiment of the invention, the logical address may be an n-tuple: <object ID, offset> or <object ID, offset ID>, where the offset ID is derived from the offset. Any type of logical address may be used without departing from the invention. Examples of commands are read requests (i.e., requests to obtain objects stored in the storage pool) and write requests (i.e., requests to store objects in the storage pool).

Figure 1C:
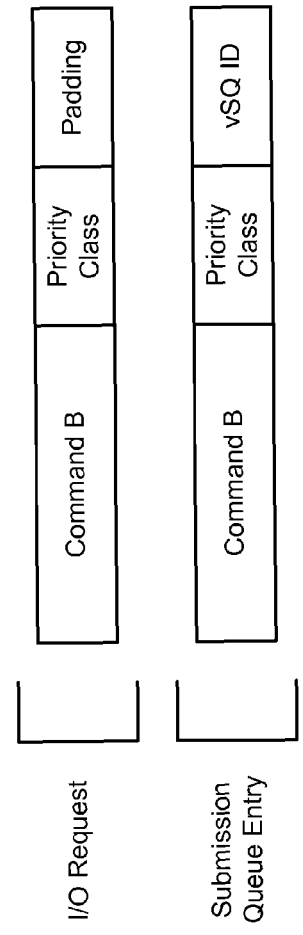

The I/O request may also include a priority class (see FIG. 1C). The priority class may be associated with the command based on (i) the application from which the command originated (e.g., all commands issued from application A have a priority class of 2), (ii) the type of command (e.g., all read commands have a priority class of 1 and all write commands have a priority class of 2), (iii) the client on which the application that issued the command originated (e.g., all commands issued from any application executing on client A have a priority class of 3), (iv) any other criterion/criteria, or any combination thereof. The priority class is then used to ultimately determine in which sSQ the submission queue entry that includes the I/O request is placed.

In one embodiment of the invention, the priority classes are initially designated by the storage controller and then communicated to the client and submission queue accelerator. At the time the priority classes are designated, there is no requirement that (i) the priority classes are used and (ii) each priority class has a particular meaning; rather, the priority classes may be used as need. For example, in one or more embodiments of the invention, one or more of priority classes may be used to designate high priority I/O requests. In such scenarios, the client may designate given I/O requests as high priority by including an appropriate priority class in the I/O request. These particular I/O requests are then placed in particular sSQs based on the priority class while other I/O requests that do not have any priority class information are placed in particular sSQs based on the vSQ with which they are associated (see FIG. 6).

Returning to FIGS. 1B-1C, the I/O request may include information other than is described above without departing from the invention. Further, the I/O requests may be implemented using any format without departing from the invention.

FIG. 1A shows a system in accordance with one or more embodiments of the invention. The system includes one or more clients (100) connected to a submission queue accelerator (118) via one or more client-side physical ports (106). The submission queue accelerator (118) is connected to a storage controller (108) via one or more server-side physical ports (120). The storage controller (108) is further operatively connected to a storage pool (114). Each of these components is described below.

In one embodiment of the invention, the client (100) is any physical system that includes functionality to issue I/O requests to the storage controller (108). In one embodiment of the invention, the client (100) may include a processor (not shown), memory (not shown), and persistent storage (not shown). The client (100) further includes functionality to execute one or more applications (102A, 102N). The applications may be user-level applications and/or kernel-level applications. The applications (102A, 102N) are configured to issue commands or I/O requests.

Figure 5:
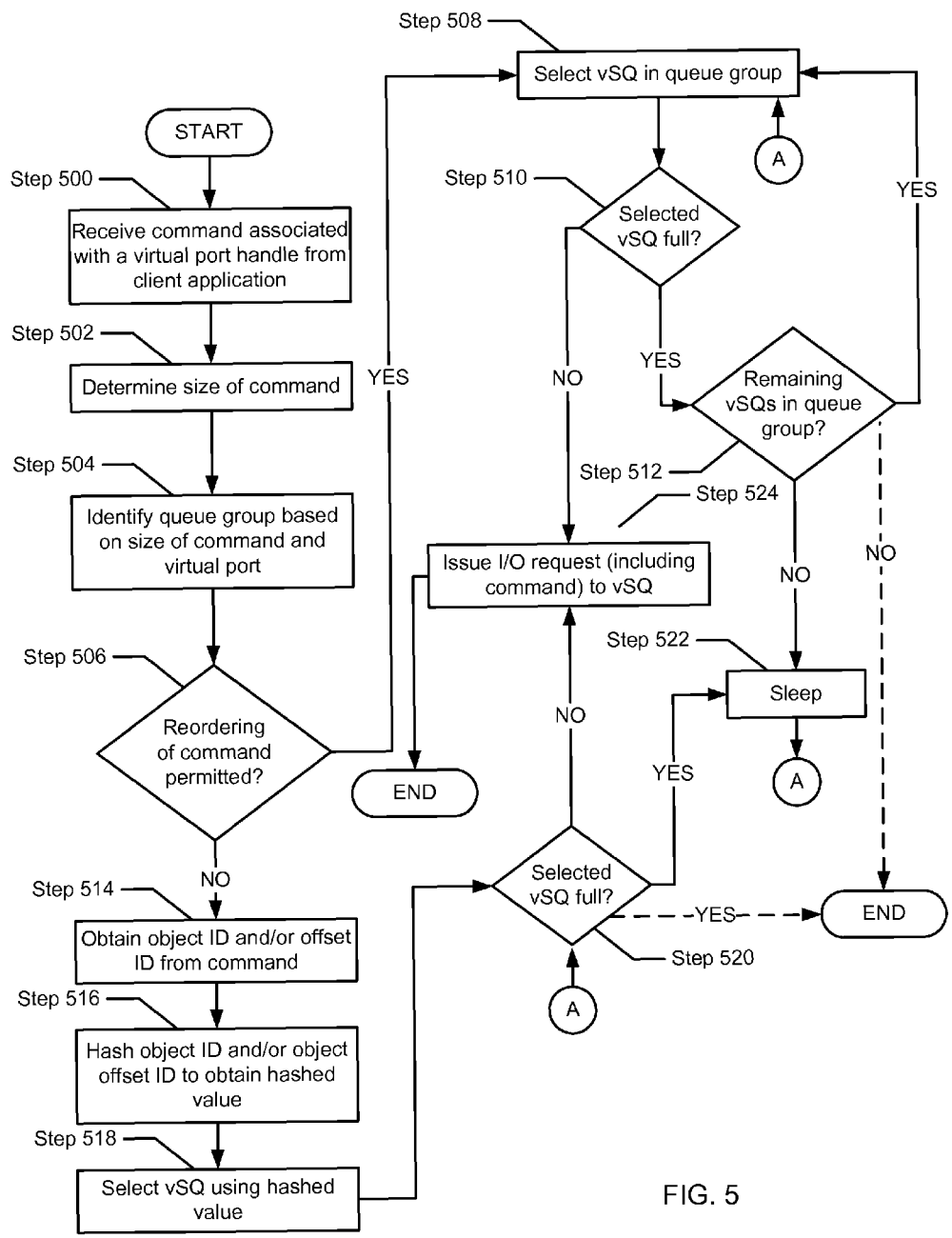
FIG. 5 shows a flowchart for processing a client request in accordance with one or more embodiments of the invention.

The storage controller device driver (SCDD) (104) is configured to receive and process the commands and/or I/O requests in accordance with the embodiments shown in FIG. 5. The SCDD (104) may provide the client applications (102A, 102N) with the appropriate virtual port handles to enable the client applications (102A, 102N) to issue commands and/or I/O requests to the SCDD (104) (see e.g., FIG. 3 and FIG. 5, Steps 308, Step 500, respectively). In one embodiment of the invention, the SCDD (104) may be executing in the user-level (as opposed to the kernel-level) of the client (100). Further, the SCDD (104) may also include functionality to map the virtual submission queues (112) to the client application address space thereby creating a unified address space (i.e., the unified address space allows the client (100) to perceive that it has the ability to directly store the I/O request in the appropriate virtual submission queue (112) without requiring any context switching).

As a result, from the perspective of the client (100), the following storage locations are part of a unified address space: (i) the client memory (not shown) mapped to the client application address space (not shown), and (ii) the region(s) of memory in the storage controller in which the virtual submission queues (112) reside. Accordingly, from the perspective of the client (100), the aforementioned storage locations (while physically separate) appear as a single pool of physical addresses. Said another way, the client may issue commands and/or I/O requests for objects stored at any of the memory addresses in the unified address space. With this mapping, the client (100) (or a process executing thereon) and/or the SCDD (104) appear to have the ability to directly store commands and/or I/O requests in a virtual submission queue (112) without requiring any context switching.

In another embodiment of the invention, the SCDD (104) may send (or otherwise provide) the command or I/O request to the storage controller (108) using one or more hardware registers. In such embodiments, each hardware register may be associated with a particular virtual submission queue (112) and the command or I/O request may be submitted to the virtual submission queue (112) by storing the command or I/O request in a particular hardware register that corresponds to the selected virtual submission queue (112) (see FIG. 5, step 508).

The SCDD (104) may also include functionality to track the characteristic and state information of one or more virtual submission queues (112). In particular, the SCDD (104) on a particular client may track the status of all virtual submission queues (112) that are associated with the virtual ports being used (or that may be used) by the client applications (102A, 102N) on the client (100). The SCDD (104) may track one or more of the following characteristics for each of the aforementioned virtual submission queues (112): (i) command size range (e.g., minimum size, maximum size, an absolute size, minimum and maximum size, etc.) of I/O objects that may be stored in the virtual submission queue and (ii) the queue group with which the I/O queue is associated. Other characteristics may be tracked without departing from the invention. With respect to state information, the SCDD (104) may track: (i) whether the virtual submission queue is full and (ii) depending on the implementation of the virtual submission queue, the current head and tail of the virtual submission queue. Other state information may be tracked without departing from the invention.

The SCDD (104) may receive characteristic and state information via application programming interfaces (APIs) provided by the storage controller (108). Alternatively, or additionally, the SCDD (104) may receive the above information by having the storage controller (108) directly store the above information in the appropriate SCDD data structures located in the client memory.

In one embodiment of the invention, each of the client-side physical ports (106) correspond to a hardware interface to which a plug or cable connects and that enables the client and the storage controller (108) to communicate. More specifically, the client-side physical ports (106) connect the client (100) to a communication fabric (e.g., a Peripheral Communication Interconnect Express (PCIe) fabric) (not shown), where the communication fabric is a collection of interconnected hardware devices (e.g., PCIe bridges and switches) that enable clients (100) and the storage controller (108) to communicate. The commands and/or I/O requests as well as the information necessary to implement the invention are communicated using the client-side physical ports. The type of client-side physical ports (106) depends on the communication fabric and/or communication protocol used between the client and the storage controller. Examples of client-side physical ports include, but are not limited to, Small Computer System Interface (SCSI), Ethernet, IEEE 1394 interface, Fibre Channel (FC), Serially Attached SCSI (SAS), and Peripheral Component Interconnect Express (PCIe).

In one embodiment of the invention, the client (100) is configured to communicate with the submission queue accelerator (118) and the storage controller (108) using one or more of the following protocols: PCI, PCIe, PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. The invention is not limited to the aforementioned protocols. The choice of protocol may necessitate the use of a particular type of client-side physical port.

In one embodiment of the invention, the storage controller (108) is configured to implement various embodiments of the invention including, but not limited to, (i) creating virtual submission queues (112) and server submission queues (116), (ii) queuing submission queue entries (see e.g., FIG. 6, step 610, 612), (iii) processing submission queue entries (116) in the server submission queues (see e.g., FIG. 7, step 704), (iv) providing virtual submission queue (112) characteristics and status to the client (100), and (v) providing server submission queue (116) characteristics and status to the submission queue accelerator (118).

In one embodiment of the invention, the storage controller (108) may also include functionality to track the characteristic and state information of one or more server submission queues (116). In particular, the storage controller (108) (100) may track the status of all server submission queues (116) that are maintained by the storage controller (108). For example, the storage controller (108) may track the number of submission queue entries each server submission queue (116) may store. Other characteristics may be tracked without departing from the invention. With respect to state information, the storage controller (108) may track: (i) whether the server submission queue (116) is full, (ii) whether there is at least one unprocessed submission queue entry in the server submission queue (116), and (iii) depending on the implementation of the server submission queue (116), the current head and tail of the server submission queue. Other state information may be tracked without departing from the invention.

In one embodiment of the invention, each of the server submission queues (116) is associated with a memory address range in memory operatively connected to (or included within) the storage controller (108). All submission queue entries for a given server submission queue (116) are stored within the memory address range associated with the server submission queue (116).

The maximum number of server submission queues (116) that may be present in the storage controller (108) may be limited by the size of a cache associated with the storage controller (108). More specifically, in this embodiment, the storage controller may determine whether there is an unprocessed submission queue entry in a given server submission queue by querying cache associated with the storage controller (not shown) (see FIG. 7, Step 700). If this query returns a cache miss, the result may be an impact on performance of the storage controller (108) due to the additional time required to determine whether there is an unprocessed submission queue entry in a given server submission queue (116). To prevent or limit the number of cache misses by the storage controller (108), the maximum number of server submission queues (116) may be determined by the maximum number of cache entries that may be stored in the cache, where each cache is associated with one server submission queue (116). Those skilled in the art will appreciate that the cache may be required to store cache entries other than those related to the server submission queues. Accordingly, the maximum number of server submission queues is typically less than the maximum number of cache entries that may be stored in the cache associated with storage controller.

In one embodiment of the invention, the maximum number of submission queue entries that may be stored in the server submission queues (116) may be limited to by memory available in the storage controller (108). The perceived depth of the virtual submission queues (i.e., the total number of I/O request that may be stored in particular virtual submission queues) that are mapped to a particular server submission queue (116) may be limited by the actual number of submission queue entries that may be stored in the particular server submission queue (116).

Figure 7:
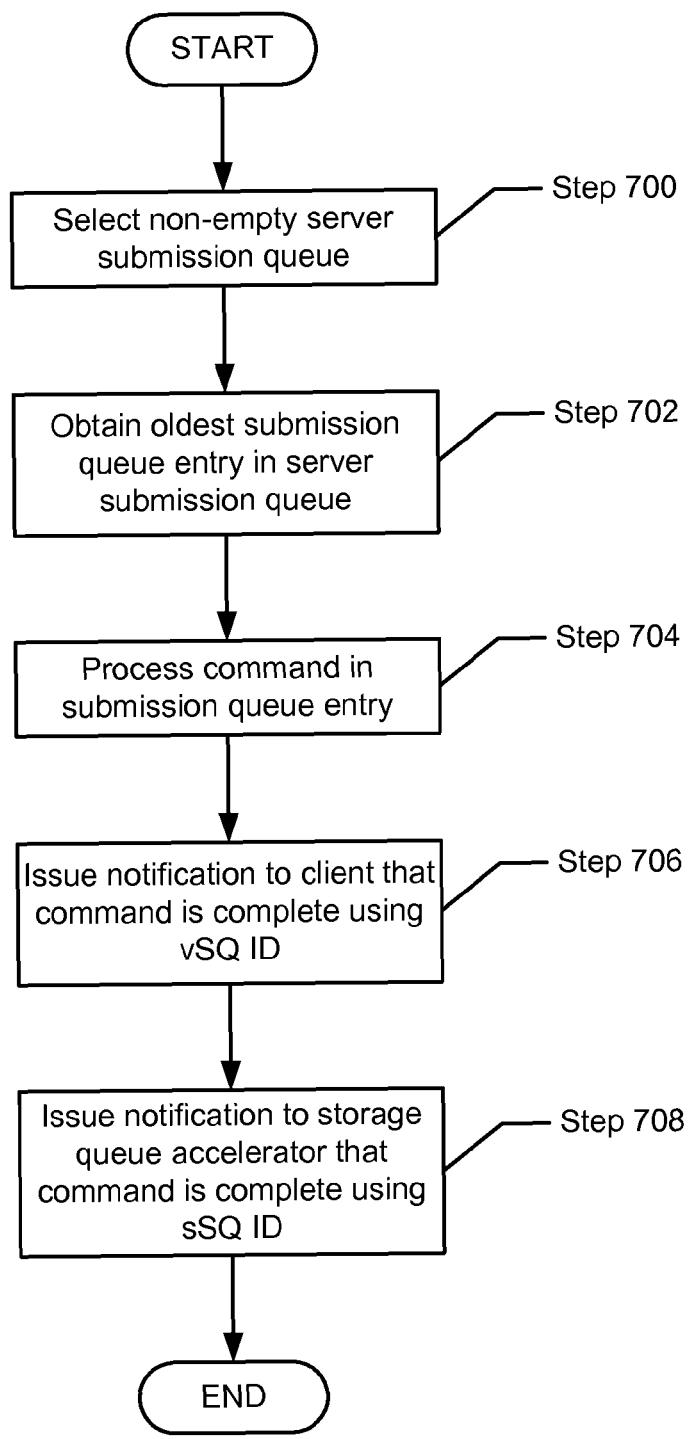
FIG. 7 shows a flowchart for processing server submission queue entries in accordance with one or more embodiments of the invention.

In one embodiment of the invention, the arbitration engine (110) is configured to process submission queue entries in the server submission queues (116) (see e.g., FIG. 7, step 704). In one embodiment of the invention, the storage controller (108)

may provide virtual submission queue characteristics and status to the client in a manner that by-passes (122) the submission queue accelerator (118).

In one embodiment of the invention, the storage controller (108) includes a processor (not shown) configured to execute instructions to implement one or more embodiments of the invention, where the instructions are stored on a non-transitory computer readable medium (not shown) that is located within or that is operatively connected to the storage controller (108). Alternatively, the storage controller (108) may be implemented using the integrated circuit including circuits configured to provide the aforementioned functionality and/or the functionality described below in FIGS. 3, 4, and 7. Alternatively, the storage controller (108) may be implemented using a Field Programmable Gate Array (FPGA), an Application-Specific Integrated Circuit (ASIC), other specialized hardware or any combination thereof. The storage controller (108) may be implemented using any combination of software and/or hardware without departing from the invention.

While FIG. 1A shows virtual submission queues (112) located in the storage controller (108), the virtual submission queues (112) do not exist. Rather, they appear to exist from the perspective of the client (100) but do not in fact exist on the storage controller (108). The submission queue accelerator (118) enables the clients (100) to continue to operate as-if the virtual submission queues (112) are actual submission queues on the storage controller (108, described below). Further, the storage controller (108) may also perform various steps (see FIGS. 3 and 7) to make it appear to the clients (100) that the virtual submission queues (112) exist on the storage controller (108).

In one embodiment of the invention, the storage pool (114) includes one or more persistent storage devices including, but not limited to, magnetic memory devices, optical memory devices, solid state memory devices, phase change memory devices, any other suitable type of persistent memory device, or any combination thereof.

In one embodiment of the invention, the submission queue accelerator (118) is located between the client (100) and the storage controller (108). All I/O requests are received and processed by the submission queue accelerator (118) prior to reaching the storage controller (108). In particular, the submission queue accelerator (118) is configured to receive I/O requests from the client(s) (100), process the I/O requests in accordance with FIG. 6, and issue corresponding submission queue entries to the storage controller (108).

The submission queue accelerator (118) includes functionality to receive I/O requests concurrently and then to place the I/O requests (in submission queue entries) in the appropriate sSQ on the storage controller (108). The submission queue accelerator (118) processes I/O requests such that the order in which the I/O requests are received is the order in which they are processed. As a result, the order of the I/O requests (which are stored in submission queue entries) in the sSQs is the same order in which the I/O requests are received by the submission queue accelerator (118). The following example illustrates the ordering scheme described above.

Consider the scenario in which I/O requests associated with vSQs 1-3 are issued in the order shown in Table 1. Further, the ordering of the individual I/O requests relative to each other is shown in Table 2. Further, assuming that the vSQ 1 is mapped to sSQ 1 and vSQ 2 and 3 are mapped to sSQ 2, Table 3 shows the resulting ordering of submission queue entries (identified using the I/O requests).

TABLE 1

Per-vSQ Ordering

| vSQ | I/O Request Order |
|---|---|
| 1 | A, B, C, D |
| 2 | E, F, G |
| 3 | H, I, J |

TABLE 2

Receipt of I/O Requests by Submission Queue Accelerator

| Time | I/O Request Received |
|---|---|
| 1 | A, E, H |
| 2 | B |
| 3 | C, F |
| 4 | G, I |
| 5 | J |
| 6 | D |

TABLE 3

Per-sSQ ordering

| sSQ | Submission Queue Entry Order |
|---|---|
| 1 | A, B, C, D |
| 2 | E, H, F, G, I, J |

Continuing with the discussion of FIG. 1A, the submission queue accelerator (118) processes I/O requests to generate submission queue entries at a line-rate (i.e., the I/O requests are processed at the same rate that they are received from the clients). Said another way, the submission queue accelerator (118) does not store the received I/O requests (i.e., the submission queue accelerator (118) does not store and forward I/O requests); rather, the I/O requests are received and immediately (or almost immediately) processed.

Figure 6:
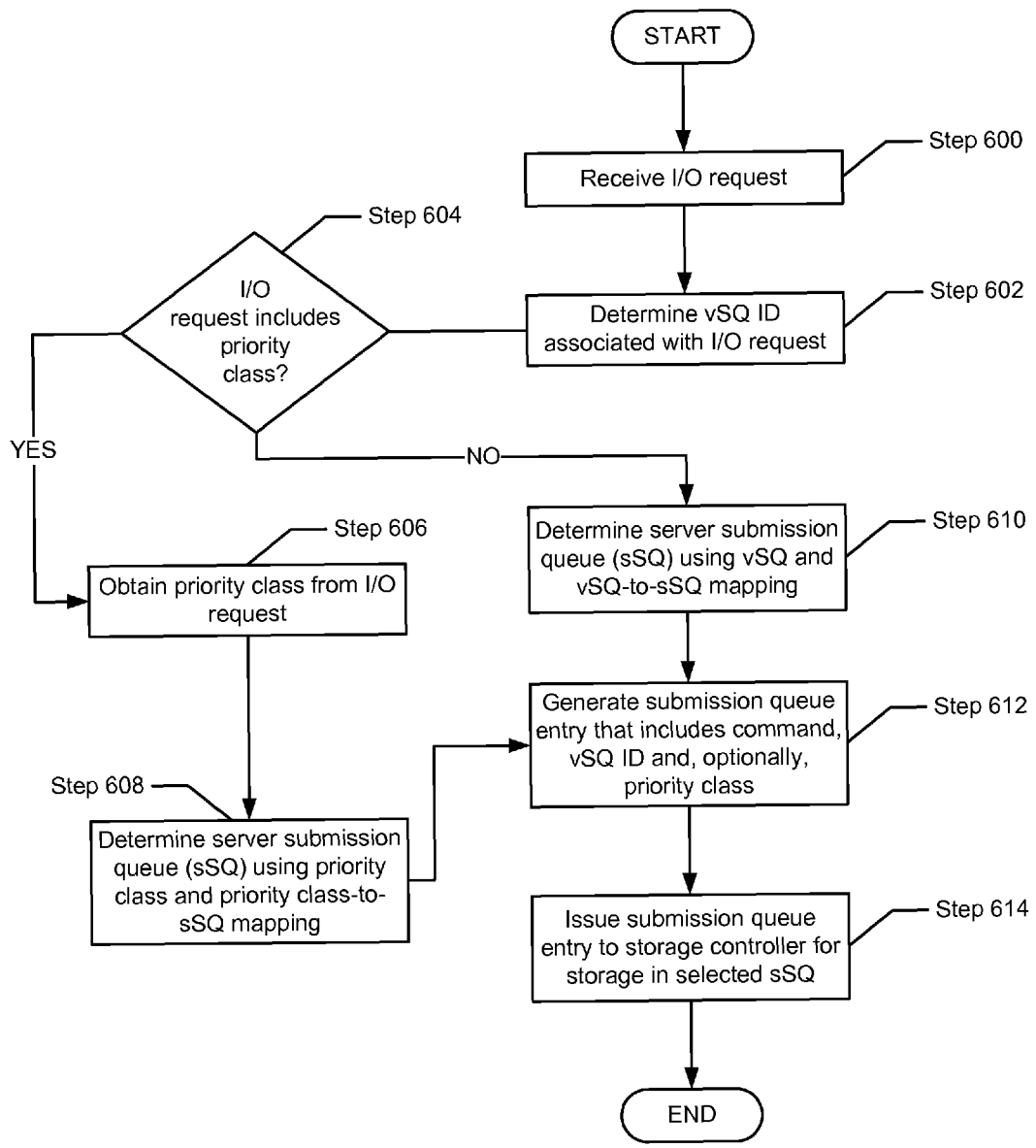
FIG. 6 shows a flowchart for processing I/O requests by a submission queue accelerator in accordance with one or more embodiments of the invention.

In one embodiment of the invention, the submission queue accelerator (118) is implemented in hardware as an FPGA, an ASIC, an integrated circuit, a process with firmware, any other hardware device that includes functionality to process I/O requests in accordance with FIG. 6, or any combination thereof.

In embodiment of the invention, the submission queue accelerator (118) includes a processor, cache memory (e.g., L1 cache, L2 cache, L3 cache), and firmware comprising instructions, which when executed by the processor, perform the functionality shown in FIG. 6. In such embodiments, the I/O requests may be temporality stored in the cache memory prior to be processed. The submission queue accelerator (118) may optionally include one or more other hardware processing units (e.g., GPUs) that processor may use to off-load at least a portion of the I/O request processing.

In embodiment of the invention, the submission queue accelerator (118) includes a processor, cache memory (e.g., L1 cache, L2 cache, L3 cache), volatile memory (e.g., Random Access Memory (RAM)) and firmware comprising instructions, which when executed by the processor, perform the functionality shown in FIG. 6. In such embodiments, the I/O requests may be temporality stored in the cache memory or RAM prior to be processed. The submission queue accelerator (118) may optionally include one or more other hardware processing units (e.g., GPUs) that processor may use to offload at least a portion of the I/O request processing.

The submission queue accelerator (118) may be directly connected (via the client-side physical ports (106)) to the clients (100) and directly connected to the storage controller (108) (via the server-side physical ports (120)). Alternatively, the submission queue accelerator (118) may be operatively connected to the clients (100) via a communication fabric (not shown) where the commands and/or I/O requests issued by the clients (100) traverse all or a portion of the communication fabric prior to reaching the submission queue accelerator (118). Further, the submission queue accelerator (118) may be operatively connected to the storage controller (108) via a communication fabric (not shown) where the submission queue entries issued by the submission queue accelerator (118) traverse all or a portion of the communication fabric prior to reaching the storage controller. The location of the submission queue accelerator (118) may vary based on the implementation provided that the submission queue accelerator (118) receives and process all I/O requests such that none of the I/O requests reach the storage controller (108) without being processed and submitted as submission queue entries to the storage controller (108).

System configurations other than the one shown in FIG. 1A may be used without departing from the invention. Further, the system may include multiple submission queue accelerators, storage controllers, clients, and storage pools without departing from the invention.

Figure 2A:
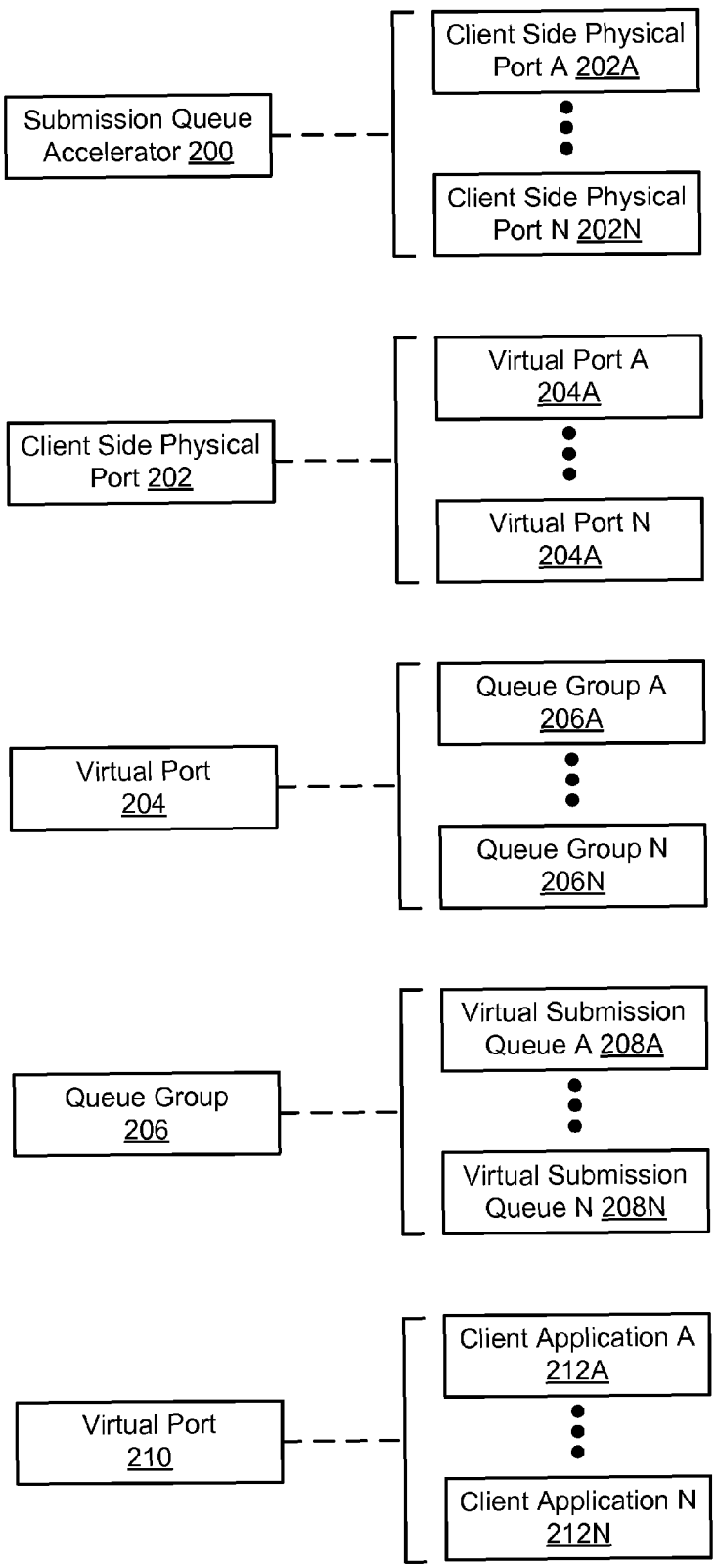
FIGS. 2A-2B show relationships between the various components in the system in accordance with one or more embodiments of the invention.
Figure 2B:
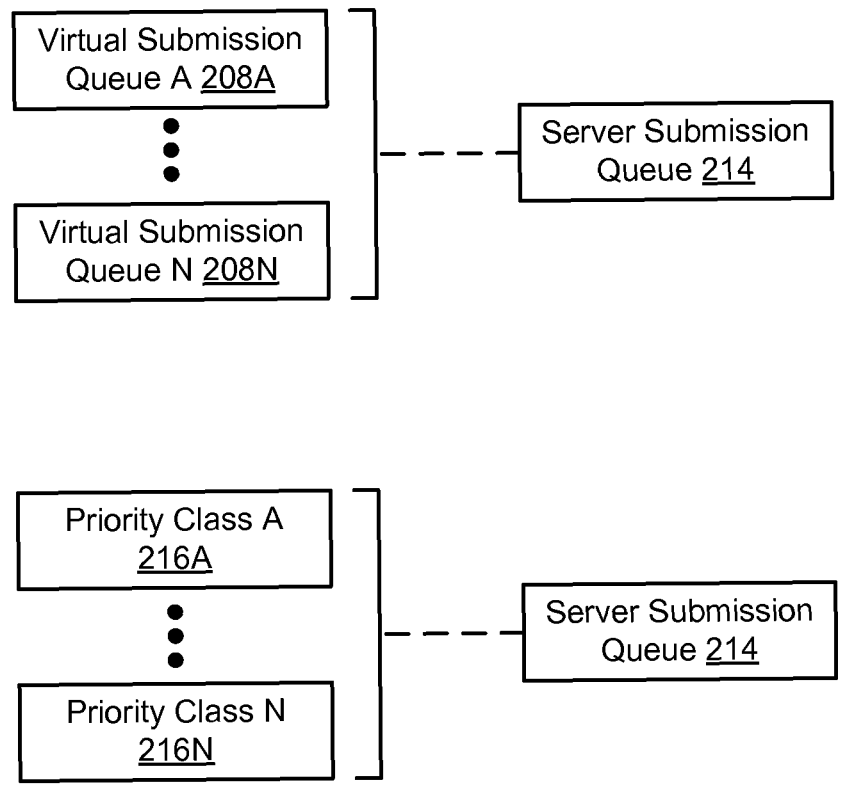

FIGS. 2A-2B show relationships between the various components in the system in accordance with one or more embodiments of the invention. Turning to FIG. 2A, as discussed above, the clients may issue I/O requests to the storage controller via one or more client side physical ports (202). Each of the client-side physical ports (202) may be associated with one or more virtual ports (204A, 204N). Each virtual port (204A, 204N) may only be associated with a single client-side physical port (202). A virtual port is a software construct that enables the system (which includes the client, submission queue accelerator, and storage controller) to virtualize a client-side physical port (202). In one embodiment of the invention, each virtual port is associated with a virtual port handle. The virtual port handle is used by the application to specify a virtual port over which to send an I/O request. Those skilled in the art will appreciate that from the perspective of the client (or client application) the virtual port appears as a client-side physical port.

The virtualization of the client-side physical port provides the system with more granular control over the client-side physical port. For example, the storage controller may allocate a portion of the total bandwidth of the client-side physical port to each of the virtual ports. The amount of bandwidth allocated to each virtual port may be set manually and/or determined heuristically by the storage controller. Any mechanism may be used to allocate the bandwidth of the physical port to the various virtual ports without departing from the invention.

Continuing with the discussion of FIG. 2A, each virtual port (204) is associated with one or more queue groups (206A, 206N). A queue group (206A, 206N) is a logical collection of virtual submission queues (208A, 208N). More specifically, each queue group (206) is associated with one or more virtual submission queues (208A, 208N). The virtual submission queues associated with a given queue group all have the same command size and queue depth. The virtual submission queue may appear to the client as a First-In First-Out (FIFO) queue. Further, the virtual submission queue may appear to the client as a ring buffer. Other implementations of the virtual submission queue may be used without departing from the invention. As discussed above, the implementation of the virtual submission queues is limited to data structures necessary to make it appear, from the perspective of the client, as though the virtual submission queues do not in-fact exist.

As discussed above, each virtual submission queue (208A, 208N) appears to the client as having a queue depth (i.e., the maximum number of I/O requests that may be stored in the virtual submission queue at any given time) and a command size (i.e., the size of the object to be read to complete the command or a size of the object to be written to complete the command). The command size limits which I/O requests may be placed in the virtual submission queue based on the size of the corresponding command. The command size may be specified as follows: (i) command size≥a minimum size, (ii) command size≤a maximum size, (iii) command size=absolute size, or (iv) minimum size≤command size≤maximum size. In one embodiment of the invention, there is a direct relationship between the command size and the queue depth. Said another way, the larger the command size the larger the queue depth and vise versa. The command size and the queue depth for virtual submission queues in a queue group may vary based on the queue group (see e.g., FIG. 4, step 406). Each virtual port (210) may be associated with one or more client applications (212A, 212N). For example, a virtual port (210) may be utilized by a single client application or by multiple client applications (212A, 212N). The association of a virtual port to a client application may vary based on the implementation.

As shown in FIG. 2B, each virtual submission queue (208A, 208N) is mapped to a single server submission queue (214). However, a given server submission queue (214) may be mapped to multiple virtual submission queues (208A, 208N).

Continuing with FIG. 2B, each priority class (216A, 216N) is mapped to a single server submission queue (214). However, a given server submission queue (214) may be mapped to multiple priority classes (216A, 216N).

FIGS. 3-7 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, one or more steps shown in FIGS. 3-7 may be performed in parallel with one or more of the other steps shown in FIGS. 3-7.

Figure 3:
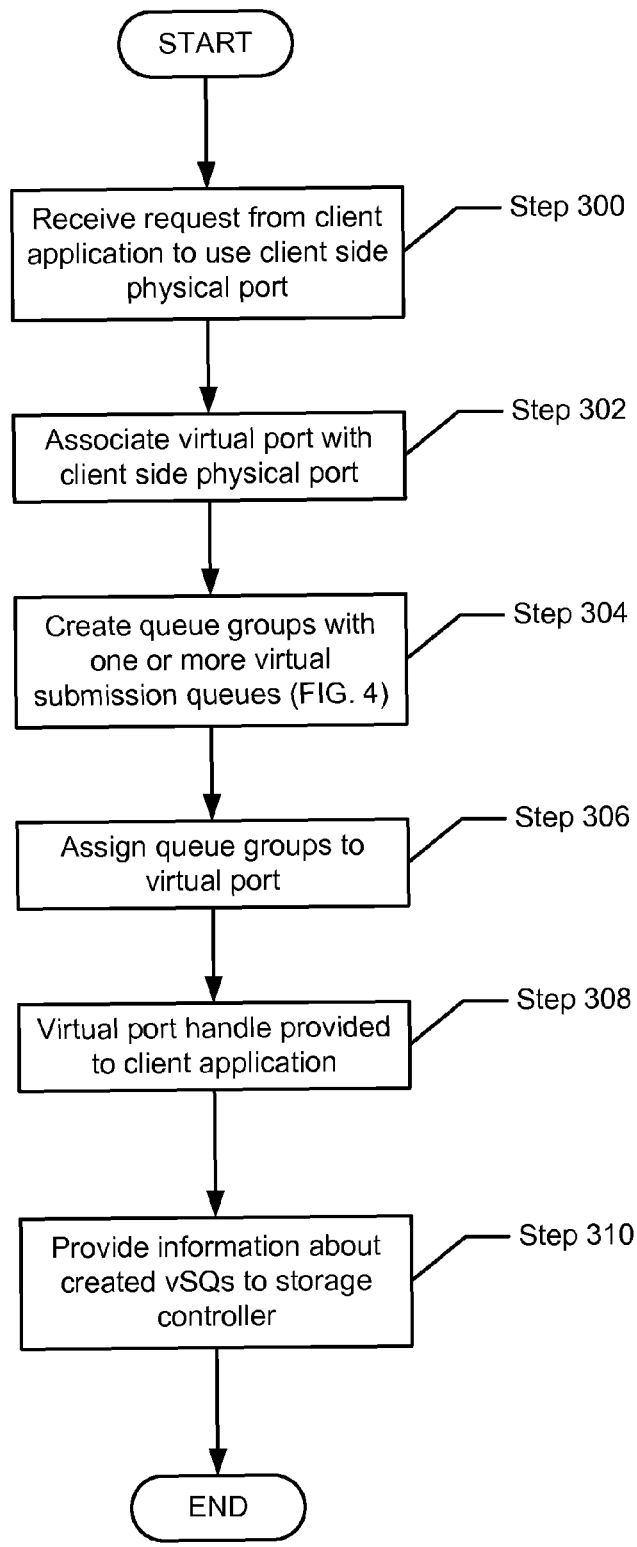
FIGS. 3 and 4 show flowcharts for processing a client request to create queue groups in accordance with one or more embodiments of the invention.
Figure 4:
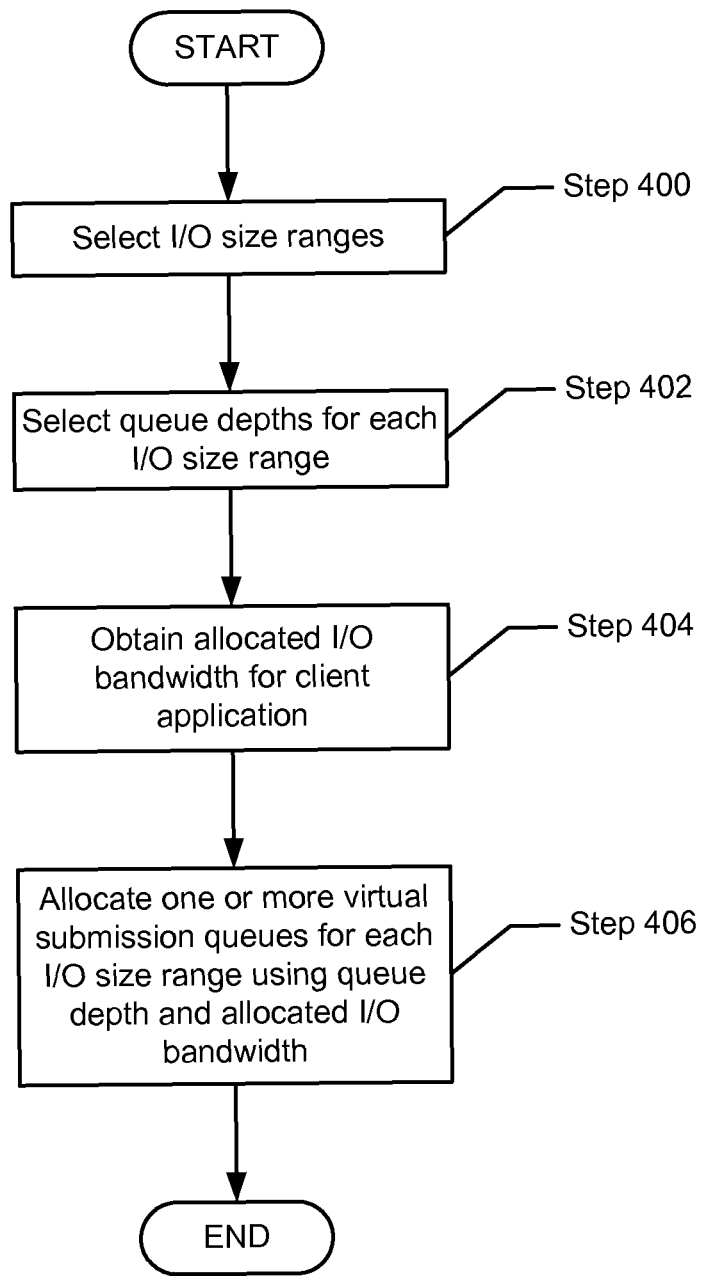

FIGS. 3 and 4 show flowcharts for processing a client request to create queue groups in accordance with one or more embodiments of the invention.

In Step 300, a request to use a client-side physical port is received from a client application. The request is received by the storage controller device driver (SCDD), which subsequently initiates the process to create the queue groups (see step 304). Prior to initiating the process to create queue groups (or prior to creating the queue groups or vSQs), the SCDD may request or may have otherwise obtained information about the maximum number of vSQs that may be created by the SCDD. As discussed above, the maximum number of vSQs may be limited to by the memory allocated on the storage controller for the server submission queues. This information may be obtained from the storage controller.

In Step 302, a virtual port is created and associated with the client-side physical port. In Step 304, one or more queue groups are created, where each virtual submission queue in the queue group is associated with a command size and queue depth. Additional embodiments related to the creation of the queue groups are described with respect to FIG. 4 below.

In Step 306, one or more queue groups created in Step 304 are assigned to the virtual port. In Step 308, the virtual port handle corresponding to the virtual port created in Step 302 is provided to the client application. At this stage, the client application may use the virtual port handle to specify the virtual port over which to send I/O requests (or commands).

In Step 310, the SCDD provides information about the created virtual submission queues to the storage controller. The information provided by the SCDD may be any information that is required by the storage controller to generate and/or update a vSQ-to-sSQ mapping, which is subsequently provided to the submission queue accelerator by the storage controller. The vSQ-to-sSQ mapping maps each vSQ to a particular sSQ. The vSQ-to-sSQ mapping may be implemented, for example, by mapping vSQ IDs to sSQ IDs or by mapping vSQ address ranges to sSQ address ranges (i.e., if an I/O request is to be stored in a given address range (which is associated with the vSQ address range, then corresponding submission queue entry is stored at an address within the mapped sSQ address range). The mapping may be implemented using other schemes without departing from the invention.

As described above in Step 304, one or more queue groups are created. One or more embodiments of the invention related to the creation of queue groups is described in FIG. 4. Referring to FIG. 4, in Step 400, command size ranges are selected. The selection of the command size ranges may be determined for example by, (i) using information provided by the client application, (ii) using historical information about the size of I/O requests that the client application has issued in the past, (iii) using default information provided by the storage controller, (iv) any other information that may be used to specify various command sizes, or any combination thereof.

In Step 402, the queue depth for each command size range is obtained. In one embodiment of the invention, there is a direct relationship between the command size and the queue depth. Said another way, the larger the command size the larger the queue depth and vise versa.

In Step 404, the allocated I/O bandwidth for the client application is obtained. The allocated I/O bandwidth may be all or a portion of the total I/O bandwidth of the client-side physical port.

In Step 406, one or more virtual submission queues for each command size range are allocated using the queue depth and the allocated I/O bandwidth. Said another way, one or more queue groups are created where (i) each queue group includes one or more virtual submission queues with a specific command size range and corresponding queue depth and (ii) virtual the number of queue groups and the number of virtual submission queues in each queue group is based on the allocated I/O bandwidth. For example, the queue groups may be created in order to fully utilize the allocated I/O bandwidth. Further, the specific combination of queue groups (each with virtual submission queues of different command size ranges and queue depths) may also be determined, in part, by information from the client application and/or historical information about the size of I/O requests that the client application has issued in the past.

For example, consider the scenario in which 80% of the I/O requests issued by the client are between 32 B-128 B and 20% of the I/O requests are between 16K-64K. In this case, there may be two queue groups—queue group 1 with a command size range of 32 B-128 B and queue group 2 with a command size range of 16K-64K—where queue group 1 has significantly more virtual submission queues than queue group 2.

In another embodiment of the invention, the maximum number of virtual submission queues created in step 406 corresponds to the number of threads that may concurrently execute the client application. In such cases, in Step 406, the only determination that is made is how many of the total number of virtual submission queues should be allocated to each command size range. As discussed above, the number of virtual submissions queues may be limited based on the server submission queues with which each are mapped.

Virtual submission queues may be allocated to queue groups using other methods without departing from the invention.

While the processes shown in FIGS. 3 and 4 is described with respect to the client application triggering the creating of the queue groups, embodiments of the invention may be implemented such that the queue groups are created and associated with a virtual port prior to receiving the request from the client application to use the virtual port. In such cases, the SCDD does not need to trigger steps to create the queue groups in response to receiving the request; instead the SCDD only needs to provide the appropriate virtual port handle to the client application. In other scenarios, the SCDD may create the queue groups and provide the appropriate virtual port handle to the client applications prior to any request for the client application. Accordingly, in this scenario, when the client application issues an I/O request or command, the I/O request or command will include the appropriate virtual port handle that was previously provided to the client application.

FIG. 5 shows a flowchart for processing a client request in accordance with one or more embodiments of the invention. The process described in FIG. 5 may be performed by the storage controller device driver in one or more embodiments of the invention.

In Step 500, a command (or I/O request) associated with a virtual port handle is received from the client application. In Step 502, the size of the command is determined. As discussed above, the size of the command corresponds to the size of the object to be read to complete the command or the size of the object to be written to complete the command.

In Step 504, a queue group is identified, where the identification of the queue group is based on the virtual port handle and the size of the command. More specifically, the virtual port handle is used to identify the virtual port. Once the virtual port is identified, the characteristics of the queue groups associated with the virtual port are analyzed to determine which of the queue groups has a command size range that matches the size of the command. "Matching" as used in this context includes determining whether the size of the command satisfies the command size range associated with the queue group.

In Step 506, a determination is made about whether the command may be reordered. In one embodiment of the invention, this determination is made by (i) identifying the object that is the subject of the command, and (ii) determination using information from the client application and/or information maintained by the SCDD that the command must be processed by the arbitration engine after a currently queued command. Because the arbitration engine does not include functionality and/or the necessary information to make this determination, this ordering may only be enforced by placing the command in the same virtual submission queue as the currently queued command. Accordingly, if the command may be reordered, the process proceeds to Step 508; otherwise the process proceeds to Step 514.

In Step 508, a virtual submission queue in the queue group identified in Step 504 is selected. The virtual submission queue may be selected using a round robin algorithm, arbitrarily selecting one of the virtual submission queues in the queue group, or selecting the virtual submission queue that includes the least number of queued I/O requests. Other algorithms or schemes for selecting the virtual submission queue may be used without departing from the invention.

In Step 510, a determination is made about whether the selected virtual submission queue (vSQ) is full. This determination may be made using the status of the virtual submission queues provided by the storage controller. If the selected virtual submission queue (vSQ) is full, the process proceeds to Step 512; otherwise the process proceeds to Step 524.

In Step 512, a determination is made about whether there are remaining virtual submission queues in the queue group in which the command may be queued. If there are remaining virtual submission queues in the queue group in which the I/O request (that includes the command) may be queued, the process proceeds to Step 508; otherwise the process may proceed to Step 522 or ends.

In Step 514, the object ID and/or offset ID is obtained (or otherwise derived) from the command. The command may include the offset and that the offset ID may be obtained by applying a bitmask to the offset. In addition, the offset may be used instead of the offset ID without departing from the invention. Further, any information that uniquely identifies the object in the storage pool may be used without departing from the invention.

In Step 516, a hash function is applied to the object ID and/or offset ID to obtain a hashed value. Any injective function may be used without departing from the invention.

In Step 518, a virtual submission queue is selected based on the hashed value. Any function that maps the hash value of a virtual submission queue may be used without departing from the invention provided that the function always maps the hash value to the same virtual submission queue.

In Step 520, a determination is made about whether the selected virtual submission queue (vSQ) is full. This determination may be made using the status of the virtual submission queues provided by the storage controller. If the selected virtual submission queue (vSQ) is full the process proceeds to Step 522 or ends; otherwise the process proceeds to Step 524.

In Step 522, the process (e.g., a process associated with the SCDD) that is handling the placement of the I/O request (that includes the command) in the appropriate virtual submission queue sleeps for a predetermined period of time and then proceeds to either Step 508 or Step 520.

In Step 524, an I/O request that includes the command and padding is issued to the selected virtual submission queue (vSQ). In one embodiment of the invention, by issuing the I/O request to the virtual submission queue, the client is attempting to directly store the I/O request in the selected virtual submission queue. In order to achieve this, the issuance of the I/O request may include specifying a memory address associated with the selected virtual submission queue, where the memory address is part of the unified address space.

In one embodiment of the invention, the I/O request may include a priority class. In such embodiments, the SCDD may determine the priority class (in the manner described above) and include the priority class in the I/O request. Alternatively, the priority class may be provided by the client application that issued the command. In one embodiment of the invention, FIG. 6 shows a flowchart for processing I/O requests by a submission queue accelerator in accordance with one or more embodiments of the invention. In one embodiment of the invention, the submission queue accelerator is configured to perform the process shown in FIG. 6.

In Step 600, an I/O request is received from a client. In Step 602, the vSQ ID associated with the I/O request is obtained. In one embodiment of the invention, the vSQ ID is obtained by determining the memory address (i.e., a memory address within a memory address range associated with a particular vSQ) in which the I/O request was intended to be written and then identifying the vSQ ID based on the memory address. The vSQ ID may be obtained using other methods without departing from the invention.

In Step 604, a determination is made about whether the I/O request includes a priority class. If the I/O request includes a priority class, the process proceeds to step 606; otherwise, process proceeds to step 610.

In Step 606, the priority class is obtained from the I/O request. In Step 608, a server submission queue is selected using the priority class and the priority class-to-sSQ mapping. The storage controller may provide the priority class-to-sSQ mapping at any point prior to step 608. Further, the storage controller may dynamically update the priority class-to-sSQ mapping. In addition, the storage controller and the SCDD may communicate with respect to the availability of the priority classes and the significance of the priority classes. This information will enable the SCDD to include, as appropriate, a priority class in the I/O request.

Continuing with FIG. 6, in Step 610, a server submission queue is selected using the vSQ with which the I/O request is associated and the vSQ-to-sSQ mapping. The storage controller may provide the vSQ-to-sSQ mapping at any point prior to step 610.

In Step 612, a submission queue entry is generated that includes the command (which was included in the I/O request received in Step 600), the vSQ ID and, if present in the I/O request, the priority class. The size of the vSQ ID may be equal to the size of the padding in the I/O request. In such cases, the generation of the submission queue entry may include modifying the I/O request to replace the padding with the vSQ ID.

In Step 614, the submission queue entry is issued to the storage controller in order to be stored in the selected server submission queue (sSQ). In one embodiment of the invention, if the submission queue accelerator has mapped the server submission queues to the submission queue accelerator address space, the submission queue accelerator may directly store the submission queue entry in the selected server submission queue by storing the submission queue entry in a memory address that is in a region of the submission queue accelerator address space that is mapped to the server submission queue.

In another embodiment of the invention, the submission queue accelerator stores the submission queue entry in the selected server submission queue as follows: (i) obtaining a memory location in the storage controller memory where the memory location is associated with the selected server submission queue, (ii) directly storing the submission queue entry in the memory location, and (iii) updating a hardware register in the storage controller with a new memory location, where the new memory location corresponds to the next available memory location in the server submission queue that a submission queue entry may be stored.

In this embodiment, the submission queue accelerator maintains a pointer to the hardware register which it uses to store the new memory location in the hardware register. Further, by updating memory location stored in the hardware register (i.e., (iii) above), the submission queue accelerator signals to the storage controller that a new submission queue entry has been placed in the server submission queue.

FIG. 7 shows a flowchart for processing server submission queue entries in accordance with one or more embodiments of the invention. In one embodiment of the invention, the arbitration engine in the storage controller is configured to perform the process shown in FIG. 7.

In Step 700, a non-empty server submission queue is selected. The arbitration engine may include functionality to prioritize the server submission queues and process the server submission queues based on the priority. In Step 702, the oldest submission queue entry in the server submission queue is obtained. The arbitration engine does not include any functionality to select a queued submission queue entry other than the oldest queued submission queue entry from the particular server submission queue. Said another way, the arbitration engine does not include functionality to determine the order in which to process submission queue entries queued in a given server submission queue; rather, the arbitration engine may only process the submission queue entries in the order in which they appear in the server submission queue. In Step 704, the command in the submission queue entry is processed. Processing the command may include writing the object to the storage pool or reading an object from the storage pool. In one embodiment of the invention, the storage controller may include functionality to concurrently the process commands. In such cases, the various steps in FIG. 7 may be performed concurrently by different processes executing on the storage controller.

In Step 706, a notification is issued to the client indicating that the I/O request (or command within the I/O request) has been processed. The notification may include the vSQ ID associated with the I/O request and/or command, where the vSQ ID is obtained from the submission queue entry in which the command is located. The notification may be used by the client to track the status of the particular vSQ and also to update the application that issued the command.

In step 708, a notification is issued to the submission queue accelerator indicating that the submission queue entry (that included the command) has been processed. The notification may include an sSQ ID associated with the server submission queue from which the submission queue entry was obtained. The notification may be used by the submission queue accelerator to track the status of the particular sSQ.

The notifications in steps 706 and 708 may be performed using any known mechanism for notifying the client and submission queue accelerator.

Figure 8:
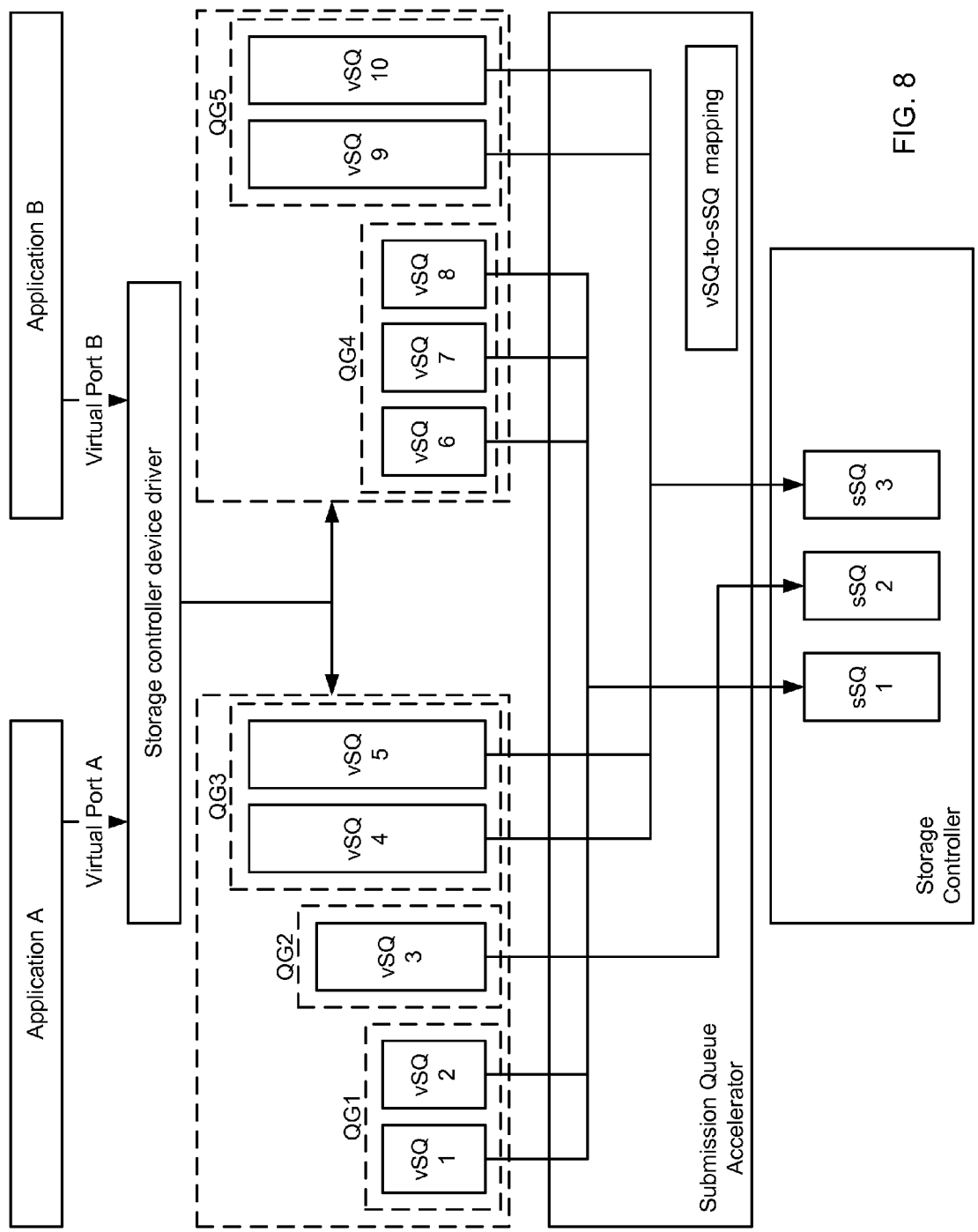
FIG. 8 shows an example of a system implementing one or more embodiments of the invention.

FIG. 8 shows an example of a system implementing one or more embodiments of the invention. The example is not intended to limit the scope of the invention. Further, various components in the client and storage appliance have been omitted for purposes of clarity in the FIG. 8.

Referring to FIG. 8, the client includes two client applications (application A, application B) both sending I/O requests to the storage controller via a single physical port (not shown). While the client applications use the same physical port, the client applications are only able to interact with the physical port via the virtual port handles provided by the storage control device driver (SCDD). Further, the client applications are only able to store I/O requests in virtual submission queues (from the perspective of the client) associated with the virtual port that has been provided, via the virtual port handle, to the client application.

By implementing embodiments of the invention, the system shown in FIG. 8 has a mechanism by which the physical port can be virtualized using the two virtual ports (virtual port A, virtual port B). Once the physical port has been virtualized, portions of the total I/O bandwidth of the physical port can be allocated to each of the client applications where the enforcement of the allocated I/O bandwidth is achieved by allocating a finite number of virtual submission queues that enable the client application to fully utilize its allocated I/O bandwidth. In this manner, the client application cannot utilize more than its allocated I/O bandwidth because the client application cannot queue more I/O requests than permitted by the virtual submission queues allocated to the corresponding virtual port.

In addition, allocating virtual submission queues in order to fully saturate the I/O bandwidth involves creating queue groups, each with one or more virtual submission queues, where the virtual submission queues in each queue group have the same command size range and queue depth. Because the size distribution of commands issued by client applications varies, embodiments of the invention permit the creation of queue groups that not only allow for full saturation of the allocated I/O bandwidth but that also take into account the size distribution of commands issued by client application associated with the particular virtual port. Returning to FIG. 8, application A is allocated five virtual submission queues (vSQ 1, vSQ 2, vSQ 3, vSQ 4, vSQ 5) divided across three queue groups (QG1, QG2, QG3). Application B is also allocated five virtual submission queues (vSQ 6, vSQ 7, vSQ 8, vSQ 9, vSQ 10); however, because the size distribution of I/O requests is different as compared with application A, the five submission queues allocated to application B are divided across two queue groups (QG 4, QG 5).

While the virtual ports are allocated to unique sets of virtual submission queues, there may be virtual submission queues allocated to each of the virtual ports that have the same command size range and queue depth. In FIG. 8, vSQ 1, vSQ 2, vSQ 6, vSQ 7, and vSQ 8 all have the same command size range and queue depth. Further, vSQ 4, vSQ 5, vSQ 9, and vSQ 10 all have the same command size range and queue depth.

The SCDD may issue I/O requests (per FIG. 4) in order to place I/O requests in one of the aforementioned vSQs, which the client perceives to exist on the storage controller. However, prior to reaching the storage controller, the I/O requests are received (or intercepted) by the submission queue accelerator and processed in accordance with FIG. 6. As shown in FIG. 8, the ten vSQs are mapped to three sSQs on the storage controller. In this example, the sSQs on the storage controller are mapped to vSQs (using the vSQ-to-sSQ mapping) based on the command size of commands in the I/O requests. Accordingly, vSQ 1, vSQ 2, vSQ 6, vSQ 7, and vSQ 8 are mapped to sSQ 1, vSQ3 is mapped to sSQ 2, and vSQ 4, vSQ5, vSQ, 9, and vSQ 10 are mapped to sSQ 3.

As shown in FIG. 8, the applications on the client continue to use a large number of vSQs while the storage controller supports the large number of vSQs using a relatively small number of sSQs.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing data to server submission queues in a storage controller, comprising:

receiving an input/output (I/O) request, wherein the I/O request comprises a command, wherein the I/O request is associated with a virtual submission queue (vSQ), wherein the vSQ appears to the client as a set of memory locations in memory operatively connected to a storage controller;

obtaining a virtual server queue identifier (vSQ ID) associated with the vSQ;

identifying a server submission queue (sSQ) based on the vSQ and a vSQ-to-sSQ mapping;

generating a submission queue entry comprising the command and the vSQ ID; and sending the submission queue entry to the storage controller, wherein the sSQ is located in the memory, wherein the storage controller is configured to place the submission queue entry in the sSQ.

2. The method of claim 1, further comprising:
prior to receiving I/O request, receiving the vSQ-to-sSQ mapping from the storage controller.

3. The method of claim 1, further comprising:
after sending the submission queue entry to the storage controller, receiving confirmation that the command has been processed by the storage controller.

4. The method of claim 1, wherein the vSQ command specifies a memory location in the set of memory locations, wherein the memory location specifies a location in the vSQ in which to store the I/O request.

5. The method of claim 1, wherein the sSQ store command specifies a memory location in the memory in which to store the submission queue entry.

6. The method of claim 1, wherein the I/O request further comprises padding and wherein the padding is replaced by the vSQ ID in order to generate the submission queue entry.

7. A system comprising:
a submission queue accelerator interposed between a client and a storage controller, wherein the submission queue accelerator is configured to:
receive an input/output (I/O) request, wherein the I/O request comprises a command, wherein the I/O request is associated with a virtual submission queue (vSQ), wherein the vSQ appears to the client as a set of memory locations in memory operatively connected to a storage controller,
obtain a virtual server queue identifier (vSQ ID) associated with vSQ,
identify a server submission queue (sSQ) based on the vSQ and a vSQ-to-sSQ mapping,
generate a submission queue entry comprising the command and the vSQ ID, and
send the submission queue entry in a sSQ store command to the storage controller; and
the storage controller configured to:
receive the sSQ store command, and
store the submission queue entry in the sSQ, wherein the sSQ is one a plurality of sSQs located in the memory.

8. The system of claim 7, wherein the storage controller is further configure to:
obtain the submission queue entry from the sSQ;
process the command in the submission queue entry;
notify the submission queue accelerator that the command has been processed using a sSQ ID associated with the sSQ; and
notify the client that the command has been processed using the vSQ ID obtained from the submission queue entry.

9. The system of claim 7, wherein the submission queue accelerator is one selected from a group consisting of a field programmable gate array (FPGA) and a Application-Specific Integrated Circuit (ASIC).

10. The system of claim 9, wherein the submission queue accelerator processes the command at a line-rate.

11. The system of claim 9, wherein the I/O request is not stored and subsequently retrieved prior to generating the submission queue entry.

12. The system of claim 9, wherein the plurality of vSQs is greater than the plurality of sSQs.

13. The system of claim 12, wherein the plurality of sSQs is limited by a cache associated with the storage controller.

14. The system of claim 7, wherein the client and the submission queue accelerator communicate using Peripheral Component Interconnect Express (PCIe) protocol, and wherein the submission queue accelerator and the storage controller communicate using the PCIe protocol.

15. The system of claim 7, wherein the command is one selected from a group consisting of a read request and a write request.

16. A method for writing data to server submission queues in a storage controller, comprising:
receiving an input/output (I/O) request, wherein the I/O request comprises a command and a priority class, wherein the I/O request is associated with a virtual submission queue (vSQ), and wherein the vSQ appears to the client as a set of memory locations in memory operatively connected to a storage controller;
obtaining a virtual server queue identifier (vSQ ID) associated with vSQ;
obtaining the priority class from the I/O request;
identifying a server submission queue (sSQ) based on the priority class and a priority class-to-sSQ mapping;
generating a submission queue entry comprising the command, the priority class, and the vSQ ID; and
sending the submission queue entry to the storage controller, wherein the sSQ is located in the memory, wherein the storage controller is configured to place the submission queue entry in the sSQ.

17. The method of claim 16, further comprising:
prior to receiving the I/O request, receiving the priority class-to-sSQ mapping from the storage controller.

18. The method of claim 16, wherein the priority class is one of the plurality of priority classes and wherein the priority class is selected to be included in the I/O request is based on at least one selected from a group consisting of the command and the client.

19. The method of claim 16, wherein the plurality of priority classes are pre-specified by a submission queue accelerator, and wherein a meaning associated with each of the plurality of priority classes may be determined dynamically.

20. The method of claim 16, further comprising:
receiving a second I/O request from the client, wherein the second I/O request is associated with a second vSQ, wherein the second I/O request comprises a second command, wherein the second I/O request does not include any of the plurality of priority classes, and wherein the second vSQ appears to the client as a second set of memory locations in the memory;
obtaining a second vSQ ID associated with the second vSQ;
identifying a second sSQ based on the second vSQ ID and a vSQ-to-sSQ mapping;
generating a second submission queue entry comprising the second command and the second vSQ ID; and sending the second submission queue entry to the storage controller, wherein the second sSQ is located in the memory, wherein the storage controller is configured to place the second submission queue entry in the second sSQ.

* * * * *